United States Patent
Franke

(10) Patent No.: US 7,747,832 B2
(45) Date of Patent: Jun. 29, 2010

(54) METHOD FOR CONTROLLING A MEMORY ACCESS

(75) Inventor: Joerg Franke, Freiburg (DE)

(73) Assignee: Micronas GmbH, Freiburg (DE)

( * ) Notice: Subject to any disclaimer, the term of this patent is extended or adjusted under 35 U.S.C. 154(b) by 365 days.

(21) Appl. No.: 11/020,880

(22) Filed: Dec. 22, 2004

(65) Prior Publication Data

US 2005/0160246 A1     Jul. 21, 2005

(30) Foreign Application Priority Data

Dec. 22, 2003   (DE)   ................... 103 61 059

(51) Int. Cl.
*G06F 13/16*   (2006.01)
(52) U.S. Cl. ................... 711/167; 711/104; 710/17
(58) Field of Classification Search ............... 711/104, 711/167; 710/17
See application file for complete search history.

(56) References Cited

U.S. PATENT DOCUMENTS

| | | | |
|---|---|---|---|
| 5,151,986 A * | 9/1992 | Langan et al. ............... 710/112 |
| 5,155,812 A * | 10/1992 | Ehlig et al. .................. 710/59 |
| 5,502,835 A * | 3/1996 | Le et al. ..................... 711/169 |
| 5,649,161 A | 7/1997 | Andrade et al. |
| 5,696,917 A * | 12/1997 | Mills et al. .................. 711/1 |
| 5,813,041 A * | 9/1998 | McIntyre et al. ............ 711/167 |
| 6,079,001 A * | 6/2000 | Le et al. ..................... 711/167 |
| 6,173,392 B1 * | 1/2001 | Shinozaki ................... 712/207 |
| 2002/0019898 A1 * | 2/2002 | Hayashi et al. .............. 710/110 |
| 2002/0032829 A1 | 3/2002 | Dalrymple |
| 2002/0188820 A1 | 12/2002 | Taruki |
| 2005/0160246 A1 * | 7/2005 | Franke ....................... 711/167 |

FOREIGN PATENT DOCUMENTS

| JP | 01195552 | 1/1988 |
| JP | 02311943 | 5/1989 |
| JP | 06250914 | 2/1993 |
| JP | 06301641 | 4/1993 |
| JP | 07049780 | 8/1993 |
| JP | 07248960 | 3/1994 |
| JP | 10283255 | 4/1997 |
| JP | 2003044354 | 7/2001 |

OTHER PUBLICATIONS

J. Handy, 'The Cache Memory Book', Copyright 1998, Academin Press, Inc. Second Edition, p. 204.*

(Continued)

*Primary Examiner*—Christian P Chace
*Assistant Examiner*—Jared I Rutz
(74) *Attorney, Agent, or Firm*—O'Shea Getz P.C.

(57) ABSTRACT

The invention relates to a method and a corresponding device for controlling a memory access, wherein a number of waiting states is established for the memory access to a storage device (FLASH/ROM, RAM, IO module) for a central control unit (CPU). A memory access is made possible in that the number of waiting states for the memory access is established individually as a function of an analysis of an instantaneous state (status) of the central control unit (CPU) and/or a type and/or address of the storage device (FLASH/ROM, RAM, IO module) being accessed.

3 Claims, 13 Drawing Sheets

OTHER PUBLICATIONS

ARM7TDMI-S Technical Reference Manual, revision r4p3, ARM Limited, Mar. 11, 2004.*

ARM7TDMI-S (Rev 3) Technical Reference Manual, ARM Limited, Sep. 2000.*

Internet Archive Wayback Machine, retreived from internet Apr. 28, 2009 [url: http://web.archive.org/web/*/http://www.arm.com/sitearchitek/armwww.ns4/html/documentation?OpenDocument], pp. 1-5.*

Internet Archive Wayback Machine, source code for Dec. 6, 2000 version of webpage http://www.arm.com/sitearchitek/armwww.ns4/html/documentation?OpenDocument, retreived from internet May 4, 2009, [url: http://web.archive.org/web/20001206122400/http://www.arm.com/sitearchitek/armwww.ns4/html/documentation?OpenDocument], pp. 1-35.*

ARM, The ARM6 Family Bus Interface, Document No. ARM DAI 0018B, Dec. 1994, pp. 13-15.

* cited by examiner

METHOD FOR CONTROLLING A MEMORY
ACCESS

BACKGROUND OF THE INVENTION

The invention relates to controlling access to a memory device.

Computers, such as an embedded controller or a conventional personal computer (PC), have a central processing unit (CPU) for control purposes. This control unit, for the temporary or permanent storage of data, by which is also meant control programs or signal processes in the broadest sense, is assigned storage devices. The storage devices can be configured as an internal component of the computer or as an external device. In particular, the storage devices can be arranged on a circuit board, on which the central control unit is arranged. The connection of the central control unit to one or more storage units preferably occurs via buses, especially an address bus for transfer of addresses or address data and a data bus for transfer of application and user data.

Storage management devices are generally known, being connected between the central control unit or a cache direct access memory (CRAM), on the one hand, and a dynamic direct access memory (DRAM), on the other, in order to relieve the burden of controlling a storage access from the central control unit. There are various kinds of access to a memory, for example, a flash memory. In the case of a random access, each memory access is equally slow. In the case of a page mode access, a verification occurs within a page, regardless of the sequence of addresses. In the case of a so-called burst mode (a type of access operation by data blocks), a data region of the memory is accessed in a particular address sequence. A special problem is represented by the different waiting times or waiting conditions, depending on the type of access and the storage type being accessed, which need to be taken into account by the central control unit in connection with memory access to the particular storage.

Generally known are storage control devices that support a simple random access, as well as page and burst mode access to static memory, such as ROM, flash or SRAM, and also insert different waiting times depending on the type of access and the storage type used, such as the ARM Prime Cell Synchronous Static Memory Controller.

As a disadvantage, only the sequential accesses are executed quickly, i.e., memory access within a page or a burst. All non-sequential access requires additional waiting conditions, for example, 2-3 clock pulses as waiting time, regardless of the possible access speed to the memory. Another disadvantage is that no additional optimizations are provided to increase the proportion of the sequential accesses. Furthermore, no use of so-called "Merged IS Cycles" is provided, in which the central control unit during an internal cycle without memory access already points to the address for the next memory access, or in which the memory control device itself already places the next meaningful address in the memory. It is likewise disadvantageous that no improvement of the performance is possible when the CPU requests more narrow access to a broad storage, such as a 16-bit access to a 32-bit storage.

There is a need for a method and a device for controlling a memory access in alternative configuration, in order to control the memory access more efficiently. In particular, the number of waiting conditions required should be reduced.

SUMMARY OF THE INVENTION

Accordingly, a method for controlling a memory access is advantageous, in which a number of waiting conditions is established for a central control unit for accessing a storage device, wherein the number of waiting conditions for the memory access is determined individually from an analysis of an instantaneous state of the central control unit and/or a type and/or address of the storage device being accessed.

A device for controlling a memory access is provided, having a first connection to a central control unit for transfer of first data or signals and a second connection for data regarding a storage device for transfer of second data or signals, as well as a control unit for controlling the access to the storage device and for establishing of waiting conditions of the central control unit, wherein the control unit is configured to analyze the first data regarding the instantaneous condition of the central control unit and/or the second data regarding the storage device where the access is supposed to occur, and to determine the waiting conditions. Accordingly, the first connection serves in particular to transfer address data for memory access to the storage device and the second connection to transfer state data, especially to transfer the number of waiting states to the central control unit, i.e., for data regarding memory access to a particular storage device.

With regard to knowledge of the instantaneous CPU state or knowledge of the type or address of the storage device being accessed, at least a portion of this information is used for a CPU access during a selection. However, this is not so for accessing of a cache controller. Here, the same cache line, usually a complete one, is always read in. Thus, for example, a 32-bit random access will be read in, requiring three waiting states, e.g., followed by another three 32-bit burst accesses, each with one waiting state, for example. The same can also apply to the burst of accesses of a DAM.

Establishing the number of required waiting states is carried out in a memory control unit separate from the central control unit and the waiting states of the central control unit are signaled by a waiting state signal. In this way, the central control unit can be spared such administrative chores.

Advantageously, when analyzing and determining the number of required waiting states, a maximum number of required waiting states for the type of memory access and/or the type of storage device being accessed is determined and used in a waiting state counter. The waiting state counter serves, in particular, to compare the waiting states already used with those still required, while the central control unit can work in parallel, undisturbed.

The analysis uses one address, which is placed by the central control unit on an address bus for the addressing of at least one storage device. Thus, there is no need for a separate transfer of the address or other data regarding the storage device being accessed, which would burden the central control unit.

An address comparator compares a present address with an address that was present at an earlier time, especially one immediately prior, to determine whether they are addresses on the same storage page, incremented addresses, and/or identical addresses, in which case the number of required waiting states will be reduced as compared to other instances.

An address comparator compares a present address with an address that was present at an earlier time, especially one immediately prior, to determine whether the now-present address is assigned in particular to an internal storage device without required waiting times and whether the address prior and subsequent to it is an address assigned in particular to an external storage device with required waiting states, in which case the number of required waiting states will be reduced as compared to other instances. In particular, the number of waiting states for the external memory access is reduced if the external memory accesses involve incrementing addresses, identical addresses, or addresses on the same memory page. Advantageous in such a method is a memory control unit that already during the cycle of memory access to the storage device independently generates an additional address and provides it to the external storage device. This saves one waiting state.

Advantageously, in the case of internal cycles of the central control unit, memory accesses to an already present address to be used in the future are carried out independently of the central control unit, in order to transfer the corresponding data at the end of the internal cycle without waiting states. The address for a subsequently anticipated access of the central control unit can be furnished by the central control unit or be generated by the memory control unit itself.

The width of a bus to the storage device is larger than the data width from the storage device required by the central control unit, in which case the number of waiting states is reduced in accordance with a more tightly clocked data transfer. Thus, the required data width is smaller than the available data width. In this way, it is possible to speed up random accesses, and page and burst accesses as well. Advantageously in this case, a bridge device between data bus and the storage device has consecutive addresses placed on it, from which intermediate addresses have been omitted, and additionally a signaling is applied for addressing of the omitted addresses.

Advantageously in the case of a memory access to a storage device with different levels of page and/or burst access types, to which different access times are assigned, corresponding maximum required waiting states for the individual memory accesses are established.

Advantageously in the case of a memory access to an open page, the number of waiting states is reduced as compared to the access to a not-opened page.

Advantageously for determining the number of required waiting states, properties of accessible storage devices and/or accessible addresses with the necessary waiting states assigned to each of them are saved in a storage device of a memory control unit to carry out the method.

Advantageously, the device is provided with a storage device or a connection to a storage device for the saving of waiting states that are assigned to addresses and/or storage devices to which such a memory access can occur.

The device includes a waiting state counter for incrementing up to a corresponding limit value required for the required memory access and with a configuration logic for signaling a waiting state signal dependent upon reaching the limit value in the waiting state counter and independently of an analysis of an address being accessed.

The number of waiting states for sequential and non-sequential accesses is determined by the corresponding access time of the particular storage device. Especially advantageously, all accesses not addressing the particular memory are masked, so that the sequential access sequences within the storage device are not disturbed. This makes possible an increase in the portion of sequential accesses.

In the known "Merged IS Cycles," one waiting state can be saved in both a sequential and a non-sequential memory access.

It is also advantageous, in the case of narrower access to a broad storage device, such as a 16-bit access to a 32-bit storage, that the waiting state for every second memory access can be eliminated.

Furthermore, the memory control unit uses an address comparator for comparing the address. For the flash, it is as if no address change were occurring. Furthermore, the memory control unit can be utilized advantageously in known "Merged IS Cycles."

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
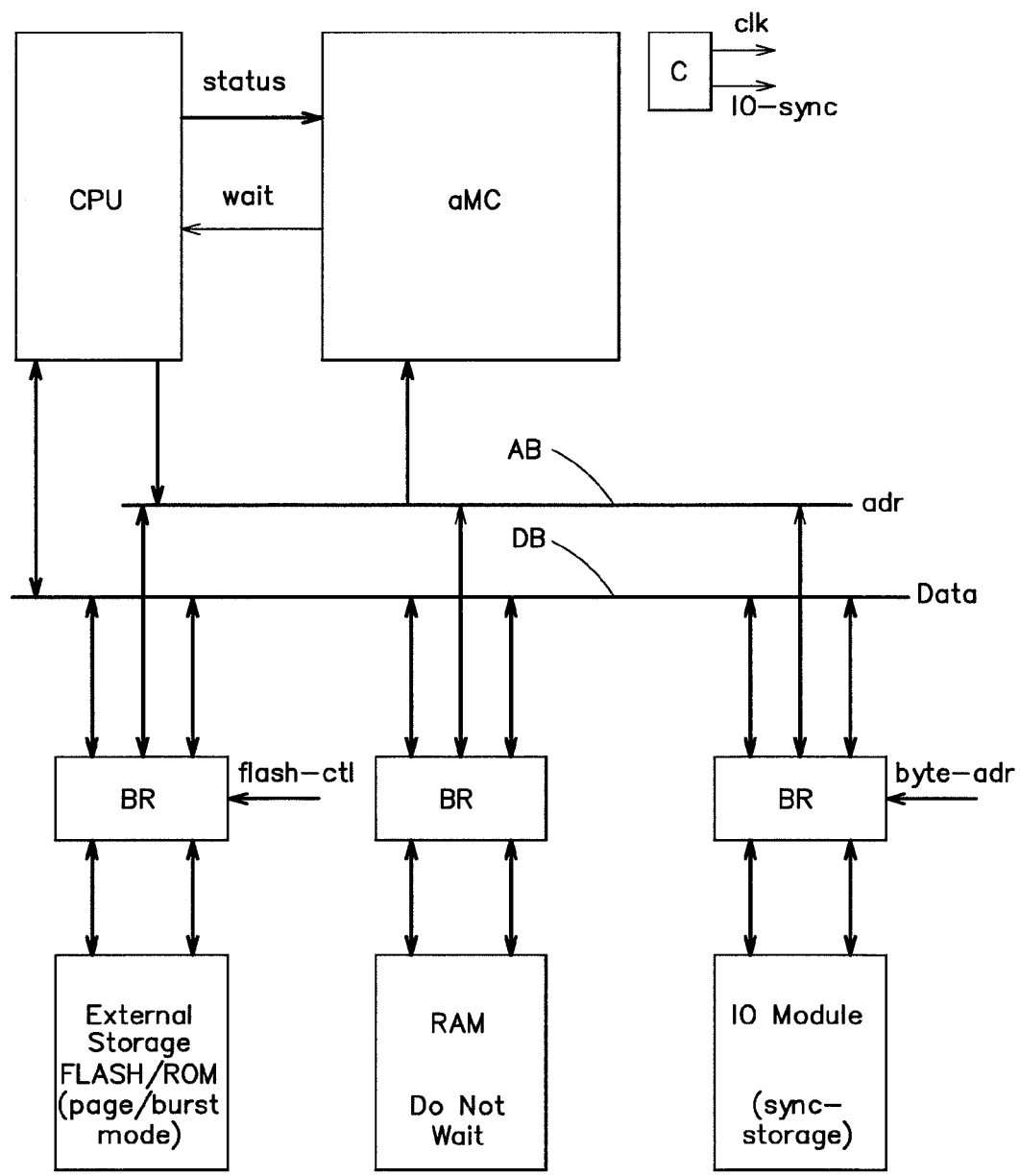
FIG. 1 shows a central control unit in a computer, which is connected via address and data buses to a plurality of highly diverse storage devices, and also via additional connections to a memory control unit.

As is apparent from FIG. 1, a preferred memory control unit aMC is used in a computer environment with a central control unit CPU, address and data buses AB, DB, and one or more storage devices FLASH/ROM, RAM and an IO module. Between the central control unit CPU and the storage devices, data is transferred via the data bus DB and optionally a bridge device BR, which is connected between the data bus DB and the storage devices FLASH/ROM, RAM or IO module. In order to actuate the corresponding memory addresses adr in the storage devices FLASH/ROM, RAM, IO module, address data or the particular addresses adr for a pending memory access are transferred via the address bus AB and possibly the bridge devices BR.

Furthermore, the memory control unit aMC is connected by a corresponding bus to the address bus AB, so that the addresses adr placed by the central control unit CPU on the address bus AB are also received by the memory control unit aMC. The memory control unit aMC, furthermore, has an input to which a connection coming from the central control unit CPU goes. Across this connection, configured in particular as a bus, instantaneous and future state information of the central control unit CPU, that is, status information "status," is taken to the memory control unit aMC. Furthermore, the memory control unit aMC has an output, forming a connection to the central control unit CPU, in order to transmit suitable data regarding the control of the pending memory access to the memory control unit aMC. These data are, in particular, waiting states, i.e., a waiting state signal "wait."

A device to configure a memory control unit aMC for controlling a memory access is thus provided in particular with a first connection to a central control unit CPU for the transfer of first data or signals, the first data transferred being (status) data regarding the instantaneous state of the central control unit CPU, and also control signals in the other direction for transfer of waiting state signals "wait". Depending on the design, additional data and control signals will also be transferred via these or other connections. Furthermore, the memory control unit is provided with a second port for data regarding a storage device FLASH/ROM, RAM, IO module for the transfer of second data adr or signals, the second data forming, in particular, an address regarding the storage device FLASH/ROM, RAM, IO module where the access is to occur. The second port in the preferred embodiment corresponds to the input where the address bus AB is connected.

As an alternative, the addresses can also be taken directly from the central control unit CPU to the memory control unit aMC, so that the second port instead of being an input for connection of the address bus AB is an input for a connection to transfer address data from the central control unit CPU. By "port" is meant, alternatively, individual logical or physical connections of a terminal device.

The second port or additional ports can also be configured to be bidirectional, in order to carry data and signals from the memory control unit aMC directly to the storage devices FLASH/ROM, RAM, IO module. The memory control unit aMC is designed, in particular, to work in a system based on a central control unit CPU with a cache storage device and a cache memory control unit, or to work in a system based on a central control unit CPU that is directly coupled to a memory.

The main task of the memory control unit aMC is to provide to the central control unit CPU, as a processor, an interface with different environments that work, for example, at different speeds, and/or enable data transfers via data buses DB with different bus widths. For example, a register field in the IO module can be operated at 8 MHz and the central control unit CPU at 50 MHz; furthermore, for example, the data bus DB for the entry and output of data into and out of the IO module has a width of 8 bit, whereas the central control unit CPU is capable of reading data in or reading data out in 8, 16 or 32-bit mode. Thus, waiting states have to be introduced.

The memory control unit aMC also generates and provides advantageously the necessary signals for controlling the bridge BR. Furthermore, the memory control unit aMC is configured to optimize the use of the waiting states when the external storage device FLASH/ROM, RAM, IO module is switched in the burst or page mode. The memory control device aMC receives information as to the type of storage device being accessed directly from the address adr, which is transmitted by the central control unit CPU via the address bus AB. Together with one or more signals or data (status) transferred, signaling the state or status of the processor or the central control unit CPU, the memory control unit decides within a single clock cycle after analyzing the received address and the instantaneous state of the central control unit CPU which number of waiting states should be used or taken into account in the central control unit CPU.

Figure 2:
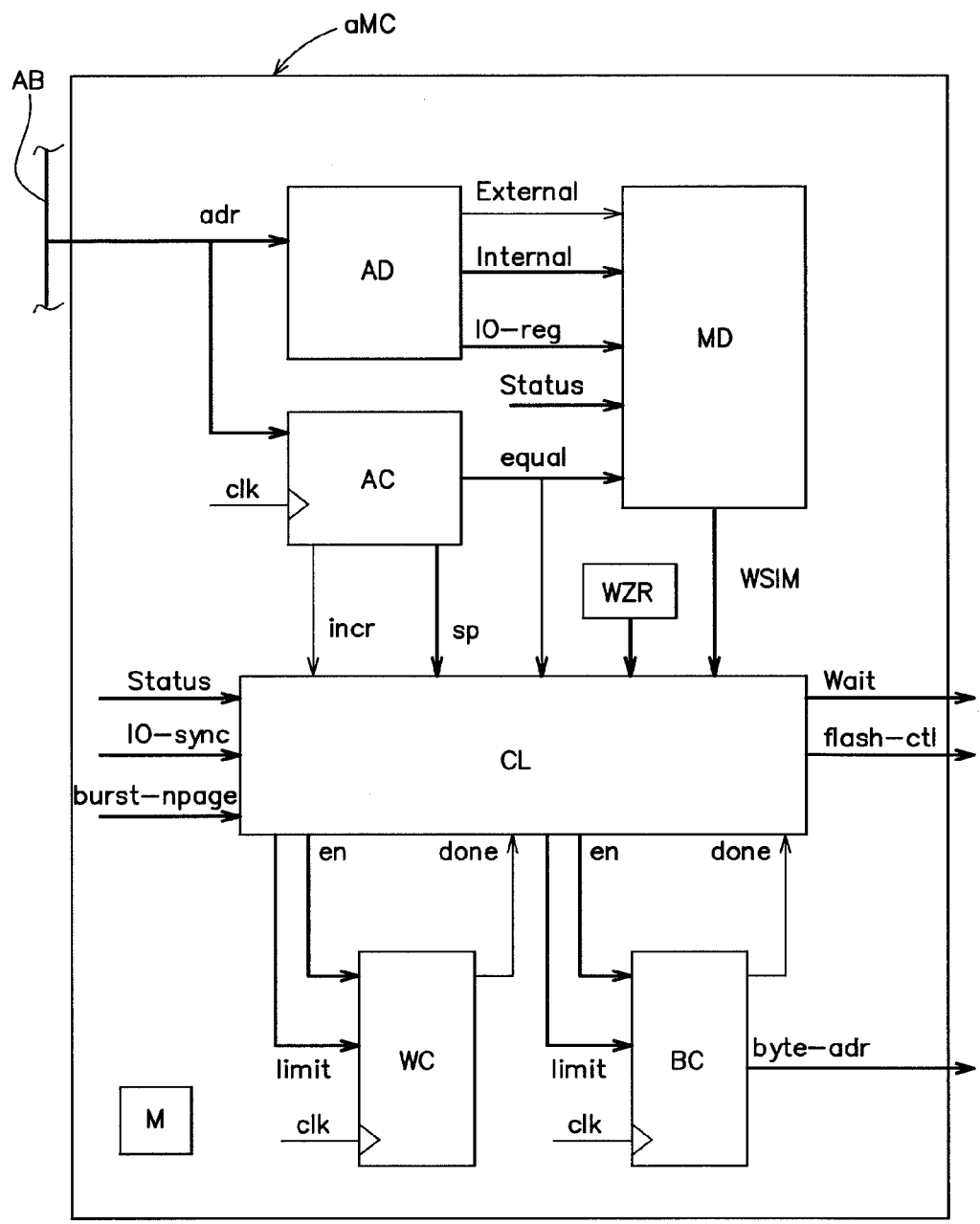
FIG. 2 shows individual components of the memory control unit of FIG. 1.

FIG. 2 shows individual components of a memory control unit aMC, which can be used to implement the described concept as individual structural components or as an integral part of an integrated control and memory unit. Depending on the configuration, the memory control unit aMC has additional structural and/or functional units and devices. Buses are represented by bold lines, as shown in FIG. 1.

From the second port, i.e., the entrance to the address bus AB, a bus goes to an address decoder AD and to an address comparator AC. The address decoder AD in the embodiment shown has three outputs, which go to a mode decoder MD. The address decoder AD analyzes the address adr received or present at its input and determines which storage device FLASH/ROM, RAM, IO module is being or will be accessed. At the first output of the address decoder AD a signal (external) is present if the analysis determines that the imposed address adr indicates a memory access to a ROM and/or FLASH as the storage device. This will signal an external memory access to the mode decoder MD. If the address adr indicates a memory access to a RAM as the storage device, an access to an internal storage device RAM (internal) will be signaled via the second output of the address decoder AD to the mode decoder MD. If the address adr present at the address decoder AD indicates a memory access to a register field of the IO module as the storage device, access to an IO register field will be signaled via the third output of the address decoder AD by a corresponding signal (IO-reg) to the mode decoder MD, i.e., a controlling of registers of the corresponding memory chip. Other lines can be used to signal additional types of memory access. It is also possible to use a single line at a single output of the address decoder, in which case a signaling of the particular address type, external, internal, or IO register access, to the mode decoder MD takes place in encoded form on the line, e.g., with different voltage levels.

The address comparator AC has, besides the input for the address adr, a clock input for a clock signal clk. The address comparator AC compares the addresses of the instantaneous and the preceding cycle of the central control unit CPU. The outcome is three different states, which in turn are output encoded via a single output or individually via several outputs or lines from the address comparator AC. A first signal incr signals a sequence of incremented addresses, a second signal "equal" signals an unaltered or same address, and a third signal sp signals a same page, by which is meant that two consecutive addresses refer to the same page in the event of a page mode for access to an external storage device. In particular, the second signal "equal" for signaling the same addresses is sent to both the mode decoder MD and to a configuration logic CL. The other signals incr, sp for signaling the incremented address and the access to an address within the same page are likewise sent to the configuration logic CL.

Besides inputs for the mentioned signals, the mode decoder MD also has an input, especially a bus input, for the furnishing of data and/or signals (status) referring to the state of the central control unit CPU. These are, for example, a memory request flag, a requested data width, or a flag for sequential accesses (sequential flag). Based on the status signals, which describe the state of the central control unit CPU, and the data or signals provided by the address decoder AD and the address comparator AC, the mode decoder MD creates a variable WSIM, which describes a waiting state insert mode. This variable WSIM forms the basis for a main control of waiting state and byte counters WC, BC. This variable WSIM, which signals the waiting state insert mode, is sent via an output of the mode decoder MD to the configuration logic CL, the transfer being preferably via a bus.

The configuration logic CL defines signals which control the waiting state counter WC and the byte counter BC. Furthermore, the configuration logic CL generates a waiting state signal "wait," which is taken across a corresponding output to the central control unit CPU for its control of the waiting states. Furthermore, the configuration logic CL generates flash-ctl signals which are taken by a corresponding output to the flash memory device FLASH being activated to control it.

The configuration logic CL is essentially designed to carry out a combinatorial function, which maps the data and signals from the various inputs onto data or signals at its outputs depending on the state of the variable WSIM for signaling the waiting state insert mode. For each value of this variable WSIM there is a particular configuration for the two counters, i.e., the waiting state counter WC and the byte counter BC. Thus, the term "configuration logic" is used for this structural and functional component. Advantageously, the fundamental function is easily modified or expanded if the memory control unit aMC requires additional interfaces, for example, to connect an external synchronous dynamic direct access memory (SDRAM).

The configuration logic CL has additional inputs, for example, for sending signals and status data to describe the instantaneous state of the central control unit CPU, for sending a synchronization signal io-sync, and for sending a burst-npage signal to determine a burst or page access.

The configuration logic CL has two outputs for each of the counters WC, BC, one output for applying an enable signal "en" and one output for applying a limit value for the particular counter WC, BC. The waiting state counter WC and the byte counter BC, in addition to the inputs for the particular enable signal "en" and the particular limit value "limit," also have an input for applying the clock pulse "clk". The waiting state counter WC and the byte counter BC are simple forward counters, raising the count value each time if the corresponding enable signal "en" is also present when the current clock pulse "clk" changes. When the counters WC, BC reach their assigned limit value, a confirmation signal "done" is placed on corresponding inputs of the configuration logic CL via a particular output. The instantaneous value of the byte counter BC is output via another output for outputting of address data "byte-adr" and used for the selection of bytes in the bridges BR. Accordingly, a transfer connection exists between the byte counter BC or the memory control unit aMC and some or all of the bridges BR. The waiting state counter WC, the byte counter BC and the configuration logic CL together form in principle a double concatenated finite state machine and both of them, on the one hand the counters WC and BC and on the other hand the configuration logic CL, can be operated in parallel.

The memory control unit aMC preferably also has waiting state registers WZR, which hold the values that determine the number of waiting states to be inserted when access is made to an external storage device in various operating states. The values are sent to the configuration logic CL. Two register pairs are also available to support hierarchical page/burst operating states.

Figure 3:
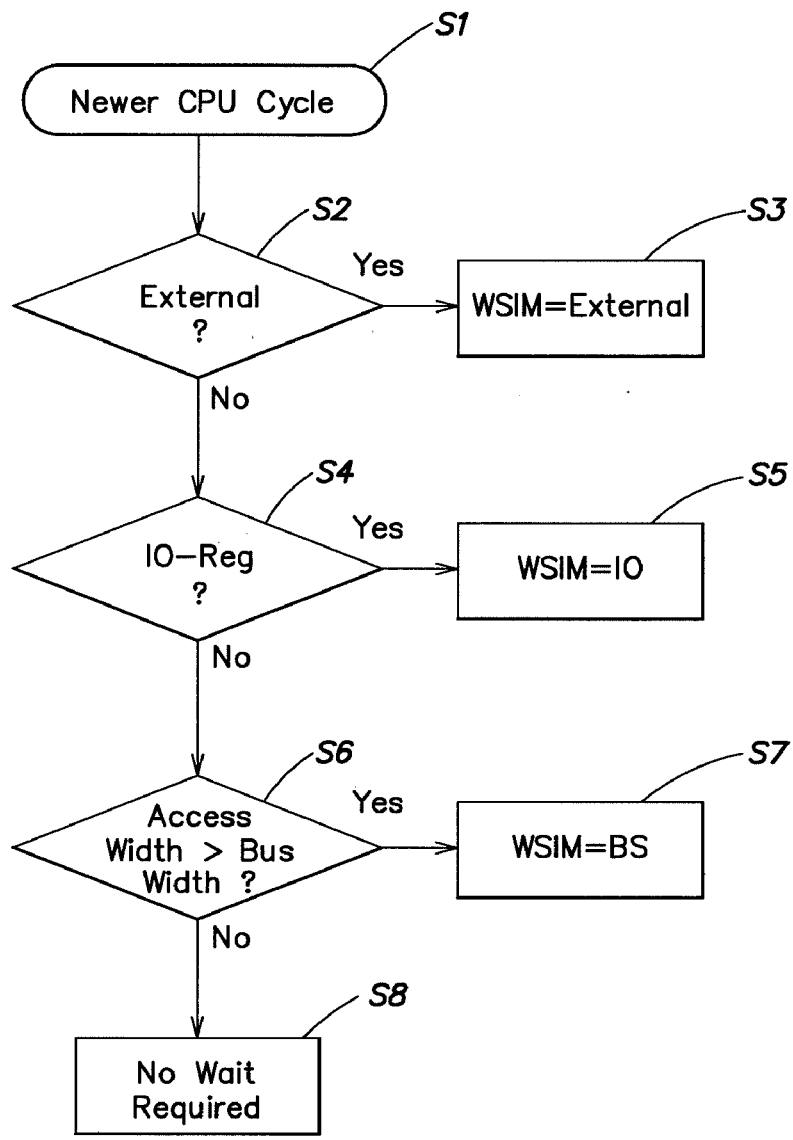
FIG. 3 is a flowchart illustration of a method for controlling a memory access in view of required waiting states.

When evaluating the operating modes, the mode decoder MD takes into account different priorities, as can be seen from FIG. 3. In the case of a new cycle of the central control unit CPU (Step S1), it first checks (Step S2) whether there is a memory access to an external storage device. If so, the variable WSIM is then (S3) given a value EXTERN, signaling the external memory access, to signal the waiting state insert mode. Preferably the highest priority mode is assigned to the external memory access, i.e., for example, if the central control unit CPU is accessing the external storage device FLASH/ROM. The number of waiting states in this mode depends on the configuration of the external storage device FLASH/ROM, especially whether it is being operated in burst mode, in page mode, or asynchronously. Corresponding waiting state counter values are programmed in configuration registers M of the memory control unit aMC, and the corresponding components, especially the configuration logic CL, access these waiting state count values according to the applied and analyzed addresses adr, as well as the applied state signal "status" of the central control unit CPU.

The next higher priority is preferably a memory access to an IO module as a storage device. In this regard, an assigning occurs for synchronization with the slower bus of IO registers. The central control unit CPU will be synchronized by a synchronization signal "io-sync," which comes from a clock generator C. The synchronization signal io-sync is applied accordingly at an input of the configuration logic CL.

In the process of analysis in the mode decoder MD, if it is determined that there is no access to an external storage device, in a following step S4 it is ascertained whether such an access is occurring to an IO module as the external storage device. If so, the variable for signaling the waiting state insert mode WSIM then (Step S5) takes on a corresponding value IO.

If no memory access is supposed to occur for such an IO module, it is then (Step S6) determined whether the data access width currently being used by the central control unit CPU is larger than the bus width of the data bus DB. If so, waiting states have to be inserted, and the variable WSIM for the waiting state insert mode is set at a corresponding value BS (Step S7). This signals a byte select mode.

If the bus width and the access width are not different, the variable WSIM for the waiting state insert mode is set at a corresponding value (Step S8), which shows that no waiting states are necessary. Accordingly, the central control unit CPU can operate at full speed. This is typically the case when the central control unit CPU is carrying out an internal cycle or accessing a storage device on the same chip, for example, a RAM, i.e., if the CPU does not require any data via the data bus DB.

The clock pulse clk and possibly additional clock and synchronization signals io-sync are provided by the clock generator C, which stands in connection with the corresponding additional devices of the system.

To achieve higher data rates during a communication between the central control unit CPU and an external storage device FLASH/ROM, the memory control unit aMC supports the page or page-access mode and the burst-access mode both structurally and functionally.

Figure 4:
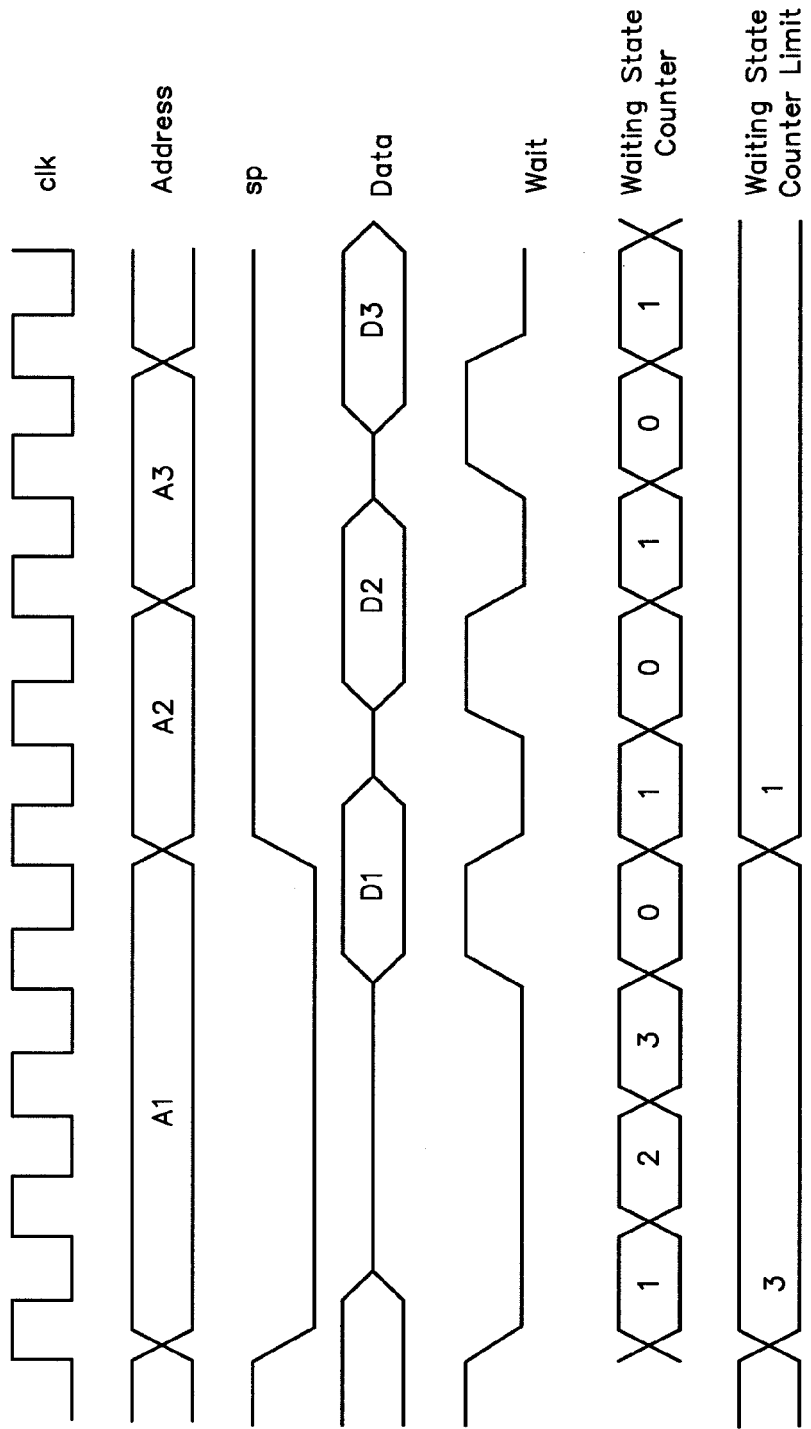
FIGS. 4-13 show comparisons of various signal and data states in the time flow of various operating modes.

FIG. 4 illustrates a time sequence of the states of various signals and data for a memory access in page mode. A FLASH or a ROM storage device is divided into pages of a certain size. If two consecutive memory accesses to the same page occur, the access time is considerably reduced. Therefore, the memory control unit aMC inserts fewer waiting states during consecutive memory accesses to the same page, as compared to accesses to different pages. The corresponding information is furnished by the address comparator AC by the corresponding signal sp, after analyzing the address "adr". FIG. 4 shows, in time sequence, first a case of access to different memory pages with three waiting states and then an access to the same memory page with only one waiting state.

The upper line of FIG. 4 represents the continuous clock pulse clk. The next line illustrates the address (adr) placed by the central control unit CPU on the address bus AB and thereafter on the memory control unit aMC. For the first four clock pulses, a first address A1 is present on the address bus AB. For the next two clock periods, a second and a third address A2, A3 are present on the address bus AB. By the address analysis, the address comparator AC determines that during the first four clock pulses there is an access to different memory pages with the first applied address A1. Accordingly, the signal sp for signaling the consecutive access to the same page is set in the low state for this period. After data have been transferred at the start of the cycle depicted, as is evident from the fourth line, no data transfer occurs via the data bus DB during the next two clock pulses, due to the signal sp being set in the low state. The central control unit CPU is in a waiting state with regard to data transfer for two clock pulses, as can be seen from the fifth line, which shows the waiting state signal "wait," which is set low for this period. Afterward, the waiting state signal "wait" is set high, so that first data D1 are transferred. The waiting state signal "wait" is then changed to the low state for one clock cycle, while the second applied address A2 is being analyzed. Since no waiting state is required for this address, after one clock pulse the waiting state signal "wait" is again set high, in order to carry out the transfer of second data D2 by a memory access to the second address A2. The same procedure with regard to the waiting state signal "wait" and additional signals takes place for the transfer of third data D3 for the third address A3. Since the second and third address A2, A3 are assigned to the same page, the signal "sp" for signaling the same address is set high throughout the corresponding clock pulses. The sixth line shows the particular state of the waiting state counter WC. During the first memory access at the first address A1, there is an access to a memory page which is not the same, so that the waiting state counter WC counts up to the value 3, corresponding to the waiting state limit 3, which is signaled to the waiting state counter WC via the corresponding signal "limit". The waiting state counter limit is shown on the seventh line. During the accesses which occur after three clock pulses to the second and third address, which are assigned to the same page as the page of the first address A1, the value 1 is used as the waiting state counter limit, so that each time the waiting state counter WC counts up from 0 to 1.

Figure 5:
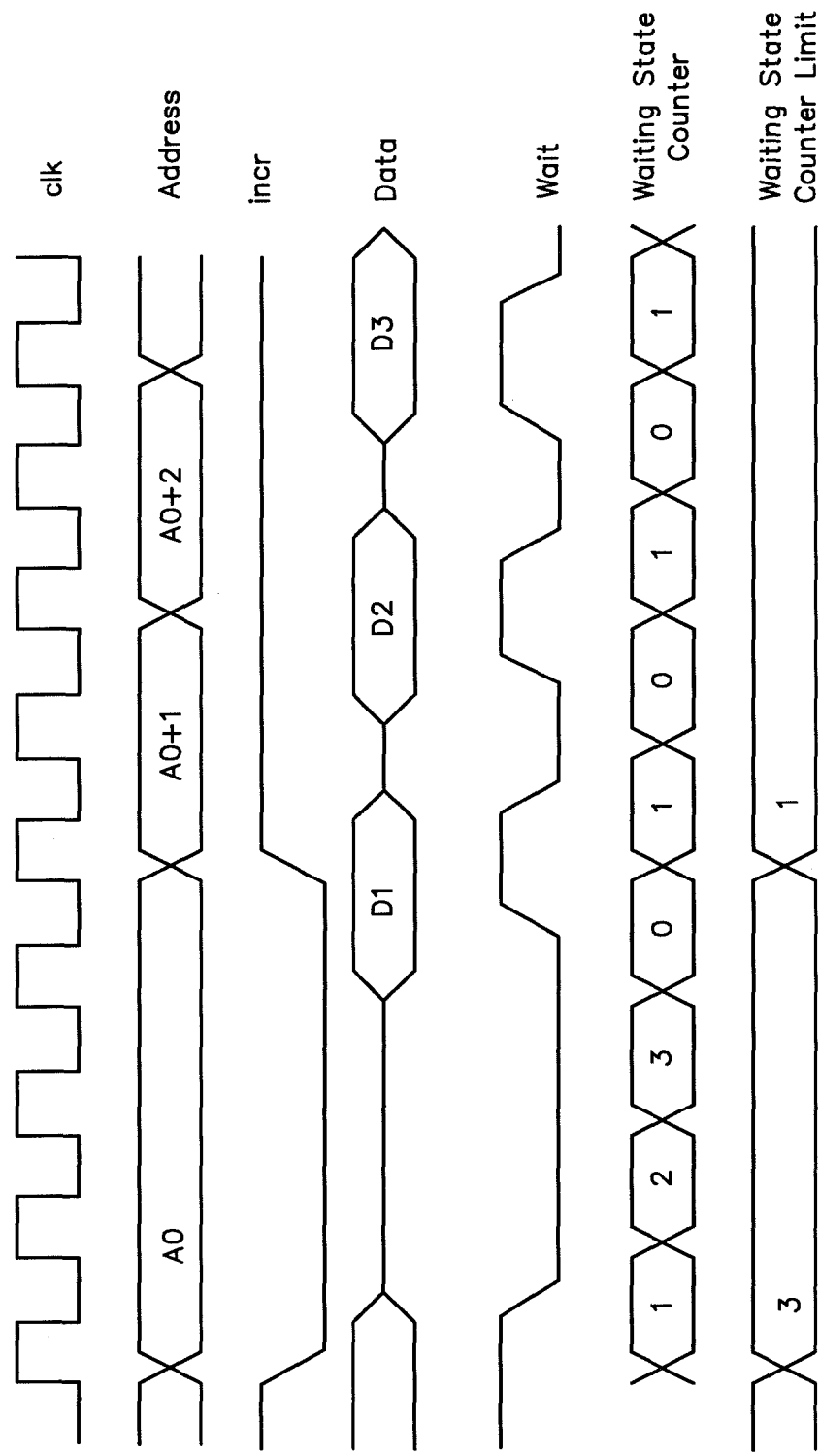

FIG. 5 represents the case of a memory access in burst mode. The burst mode flash storage device FLASH has a built-in mechanism which enables faster memory access to data, provided the address is only incremented relative to a previous address. Thus, in burst mode, there is access to a group of data, each with consecutive addresses A0, A0+1, A0+2, as can be seen from the second line in FIG. 5. If the address present at the address comparator AC does not have any relation to the previous address or the end of a burst sequence has been reached, asynchronous access times will be used. Accordingly, the address comparator AC furnishes the signal "incr" to signal incrementing addresses in a low state. In the case of incrementing addresses, this signal "incr" is set in the high state. The end of the signaling of a burst can be provided, for example, by a special output of the flash memory device to provide a corresponding signal "burstnpage," or via a burst counter integrated in the memory control unit aMC. FIG. 5 represents, for example, the case in which a first address A0 regarding first data D1 is present during the first four clock pulses, being transmitted in asynchronous mode making use of three waiting states. After this, there is access to a second and a third address A0+1, A0+2, having an address value incremented by 1 each relative to the first address. Accordingly, the signal "incr" to signal incrementing addresses is set in the low state for the first four clock pulses to signal the asynchronous memory access and then in the high state to signal the synchronous memory access. The transfer of the data D1, D2, D3, the signaling of the waiting state signal "wait," the states of the waiting state counter WC, and the waiting state counter limits correspond to those of the example in FIG. 4, so that reference is made to these for the descriptions of the individual states. The memory control unit aMC also allows for special features.

Figure 6:
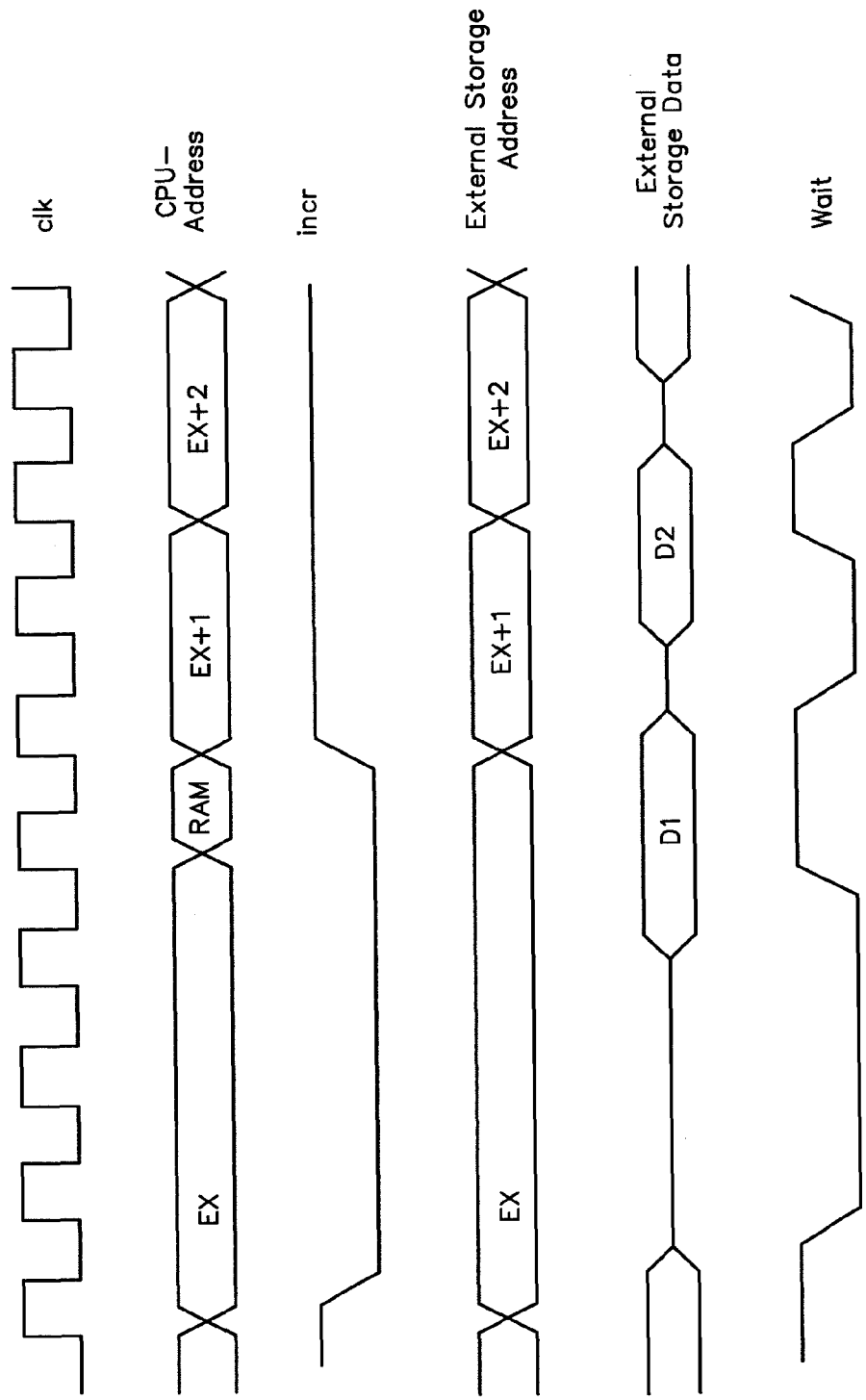

When the address comparator outputs signals incr, equal, sp to signal incrementing addresses, same addresses, and addresses on the same page, this serves to set the correct number of waiting states for only external memory access, so that in these cases only external memory access is to be taken into account by the memory control unit aMC and by the central control unit CPU. If, for example, a burst sequence is interrupted by an intervening memory access to a direct access storage RAM, this has no influence on the waiting states used or yet to be used for the memory access in the burst mode, as illustrated in FIG. 6. The second line, once again, illustrates the address set by the central control unit CPU on the address bus AB. During the first four clock periods "clk," an address EX is present on the address bus AB for access to an external storage device FLASH. For the next clock pulse, the central control unit CPU accesses a direct access memory, i.e., an internal storage device RAM and signals this by applying a corresponding address RAM. During the next two clock pulses "clk," the central control unit CPU again accesses the external storage device FLASH, but at external addresses EX+1, EX+2 incremented relative to the first address EX. Accordingly, during the first four clock pulses the signal "incr" to signal incrementing addresses is placed in the low state. During the access to the internal storage device RAM, this signal incr remains in the low state. The memory control unit recognizes via the address decoder AD that this access involves a memory access to an internal storage device and signals this to the mode decoder MD. When the following incrementing addresses EX+1, EX+2 are applied, the memory control unit aMC recognizes that this involves a further access to the external storage device FLASH and that moreover the applied addresses are incrementing external addresses EX+1, EX+2, so that the signal incr for signaling incrementing addresses is set in the high state. Accordingly, an external storage address EX for an external memory access is maintained during the first five clock pulses and thereafter external storage addresses EX+1, EX+2 are maintained for two subsequent clock pulses clk apiece. Accordingly, after four clock pulses clk, there occurs the transmission of first external memory data D1 and, each time displaced by two clock pulses clk, the transmission of second and third external data D2, D3. The corresponding waiting state signal "wait" is accordingly set in the low state from the first to the fourth clock pulse clk, in order to signal to the central control unit CPU the necessary waiting state with regard to the external memory access, after which the waiting state signal "wait" is then placed alternately in the high or low state for one clock pulse each, in order to perform the transfer of the data D1, D2, D3. Thus, FIG. 6 illustrates a type of masked memory accessory to an internal address RAM.

Figure 7:
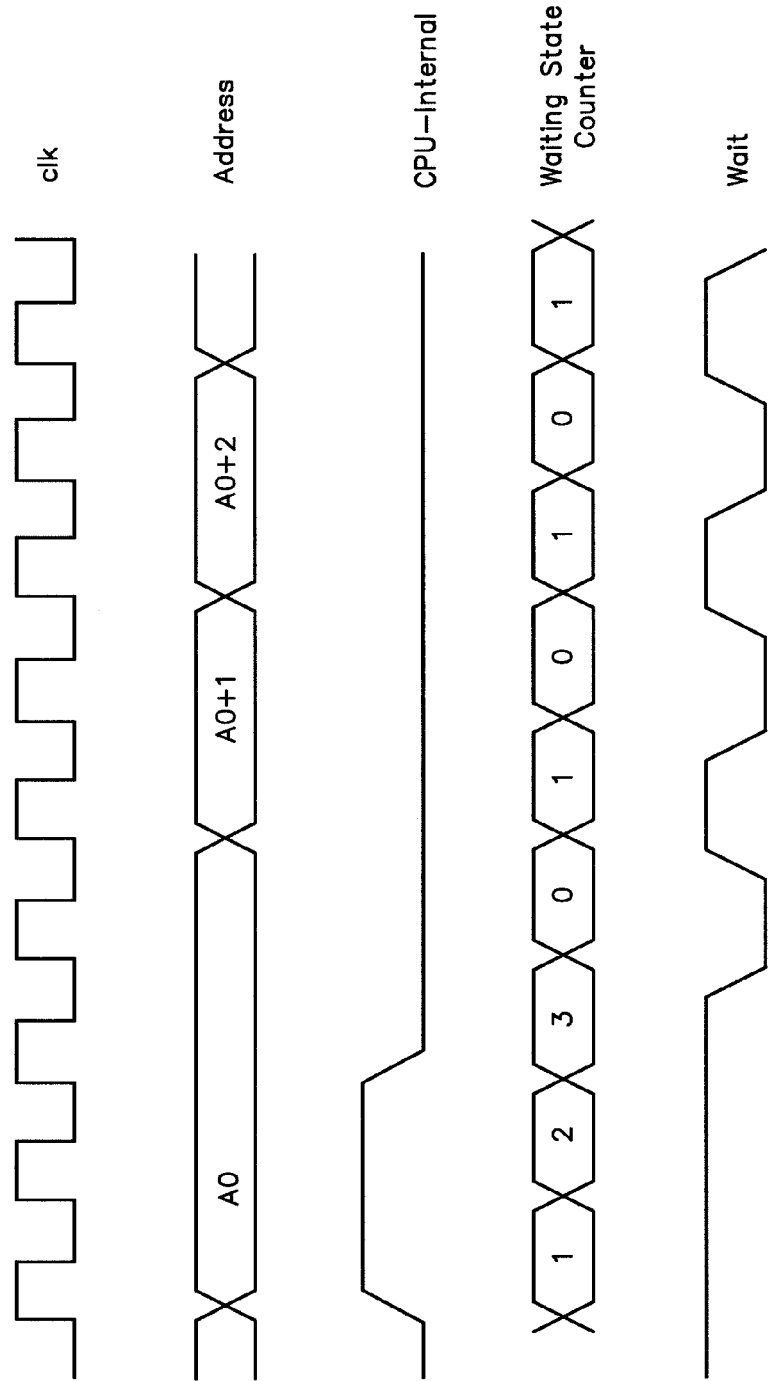

FIG. 7 illustrates the case of merged internal memory accesses and corresponding waiting state cycles. During the internal cycles, the central control unit CPU performs processing steps without a data access. Depending on the type of instruction, the address for the cycle following the internal cycle appears on the address bus AB already within the internal cycle. This setting of the address for future use on the address bus AB can be done one or more cycles in advance before the required memory access. This offers the advantage that, during the cycles when the central control unit CPU is in internal cycles, the memory control unit aMC can already be accessing the external memories FLASH/ROM, IO module to be accessed afterward and can increment the waiting states in parallel with the internal cycles. FIG. 7 shows an exemplary case in which two internal cycles are followed by an asynchronous external memory access, which requires three waiting states. The access to the external memory FLASH is started already at the start of the first internal cycle, since the required first address A0 is already available on the address bus AB. During the internal cycles, a signal "CPU-intern" arriving from the central control unit CPU is placed in the high state at the memory control unit aMC via the status signal. After the two internal cycles are finished, this signal is again placed in the low state by the central control unit CPU. As shown, for the first four clock pulses clk the first address A0 for the asynchronous memory access is present on the address bus AB. During this time, the waiting state counter is incremented for each clock pulse clk. As illustrated by the waiting state signal "wait", the otherwise typical waiting states of the central control unit CPU are eliminated, since the memory control unit aMC was able to prepare the access to the external storage device FLASH already during the internal cycles. Accordingly, the waiting state signal "wait" is only placed in the high state during the first two clock pulses clk, and is then placed for two clock pulses each in the high and the low state, in order to carry out the accesses to the first external address A0 and the following incrementing external addresses A0+1, A0+2. Any data saved in the meantime can be kept optionally in an additional storage device in the memory control unit aMC, in the central control unit CPU, or in a memory connected to the latter, as also applies to the other embodiments.

Figure 8:
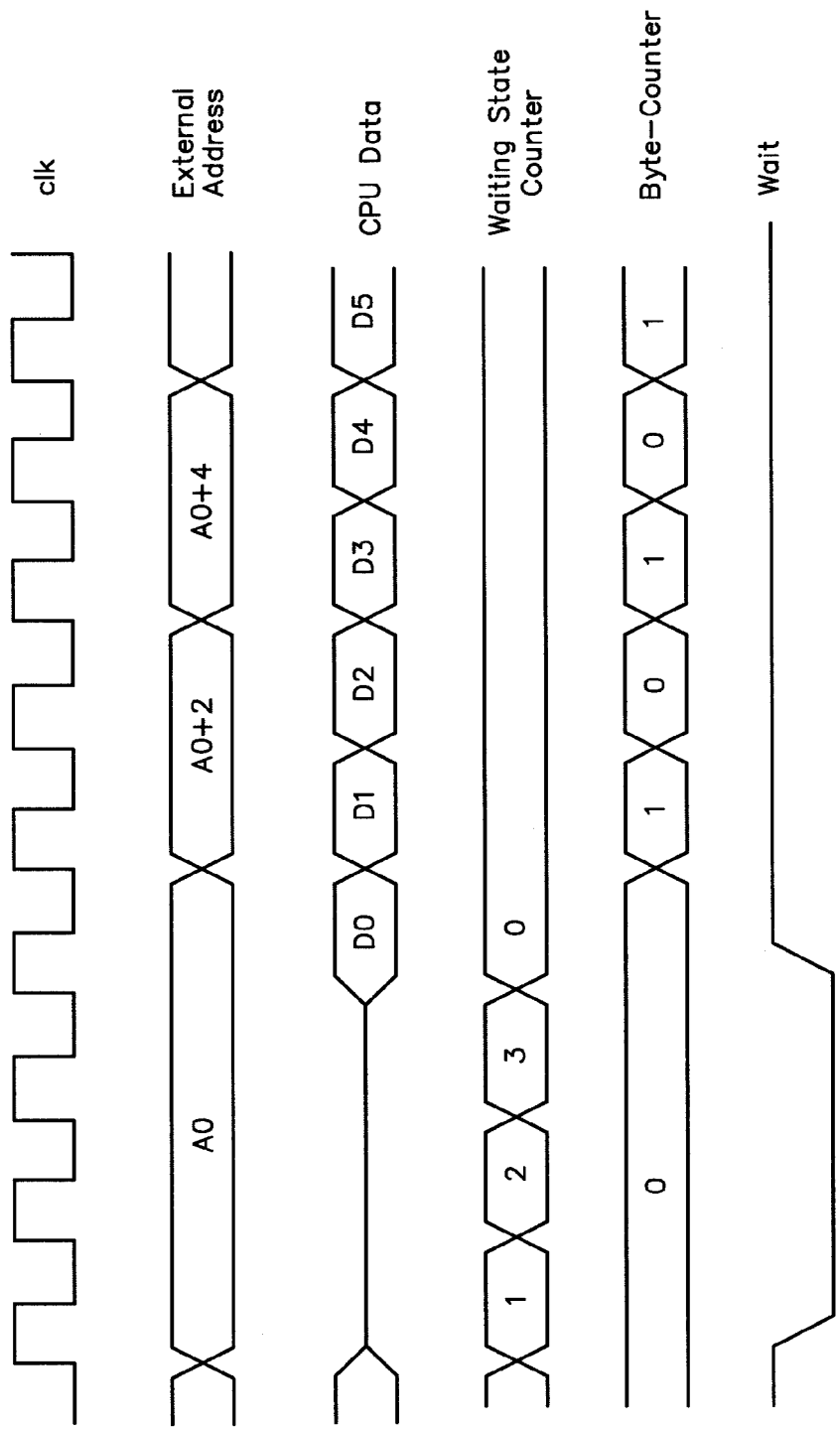

FIG. 8 shows an embodiment for a different type and way of increasing the data rates during a data transfer between the central control unit CPU and an external storage unit, also designated here as oversampling. For example, consider the case of an external storage device, IO module, which is connected to the system or in particular the central control unit CPU via a bus, especially a data bus DB, for transfer of data between them, the width of the bus being N-fold wider than the required data width. Accordingly, by arithmetic there are N-fold fewer accesses required to the external storage and consequently a significant number of waiting states can be economized.

The depicted example shows a case in which the central control unit CPU retrieves a 16-bit operating code (OP-code) and the external storage device is connected to the central control unit CPU by a 32-bit bus. For the first access to a first address A0, three waiting states are required in known fashion, before the first data D0 are transferred. For accesses to subsequent addresses, each time one waiting state would be required prior to the transfer of additional data D1-D5, without an oversampling. However, the oversampling depicted in the present case enables a continuous data stream, i.e., the following data D1-D5 can be transferred in succession without waiting states via the data bus DB, as long as the memory access occurs at addresses within a burst sequence or a page. As can be seen from the figure, during a first clock pulse clk an address A0 is placed on the address bus AB, during a fifth clock pulse clk an address A0+2 is so placed, and during a seventh clock pulse clk an address A0+4, i.e., every two clock pulses following the start of the data transmission an address is applied omitting the particular following address. The waiting state counter WC counts from 1 to 2 to the limit value 3 during the first four clock pulses clk and is then set back to 0. The waiting state counter WC remains here during the subsequent transfers. While the waiting state counter WC is being incremented, the byte counter BC remains at 0. With the start of the data transfer, according to the concept of oversampling, the byte counter BC is incremented to the value 1 each time a new address A0+2, A0+4 is applied, and after one clock pulse clk it is set back to 0. During this time, data D1, D3 are transferred during a first of the two clock pulses and data D2, D4 during a second of the two clock pulses. The second data D2, D4 correspond to the data of the addresses omitted when applying the external addresses A0+2, A0+4. The waiting state signal "wait" is set in the low state during the first four clock pulses, during which the first address A0 is presented, in order to signal the waiting state. After this, the waiting state signal "wait" is left continuously in the high state. Alternatively, a configuration is also possible in which the byte counter is not used.

Figure 9:
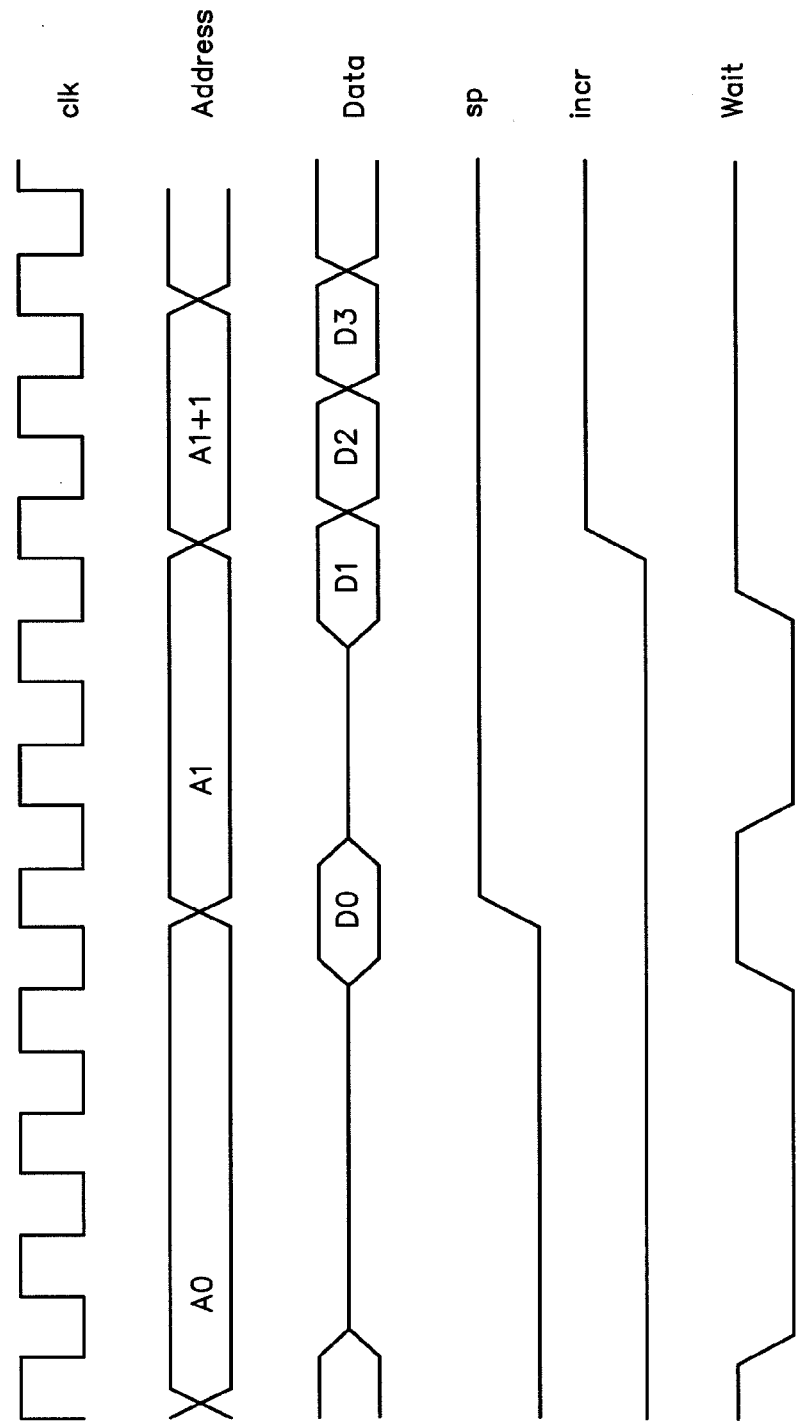

Using FIG. 9, we shall now discuss an exemplary embodiment in which hierarchical accesses to pages and/or burst mode accesses to a storage device take place. The external storage device can thus be organized so that it has several hierarchical levels of the page and/or burst storage access type. Each of these levels can be assigned different memory access times. The present exemplary version of a preferred memory control unit aMC supports a hierarchy with two levels in either a page-subpage mode or in a page-burst mode. The flowchart in FIG. 9 illustrates a hierarchical example of a page-burst mode with oversampling on the bottom-most level. A random direct (RANDOM) memory access on the uppermost (top) level requires three waiting states, as illustrated by the first applied address A0 with a waiting state signal "wait" set in the low state for three clock pulses clk. For a memory access in the same page and for a non-burst memory access, two waiting states are required, as illustrated by the next applied second address A1 with a correspondingly shorter duration of the low-set waiting state signal "wait". Before application of the second address A1, the waiting state signal "wait" is in the high-set state for one clock pulse, so that first data D0 are transferred. Two clock pulses clk after the lowering of the waiting state signal "wait" by applying the second address A1 to the address bus AB, the waiting state signal "wait" is again set high, so that further transfers of data D1, D2, D3 can take place. After application of the second address A1, a third address A1+1 or A2 is applied, which in the exemplary embodiment depicted represents the case of an in-burst access, which actually requires one waiting state, but in the present instance we are considering the case where, due to the possible oversampling by application of directly consecutive additional addresses A3, it is possible to proceed without waiting states.

With the application of the second address A1, the signal sp for signaling an access to the same memory page is set from the low to the high state. Upon application of the third address A1+1, the signal for signaling the incrementing "incr" is set from the low to the high state.

Figure 10:
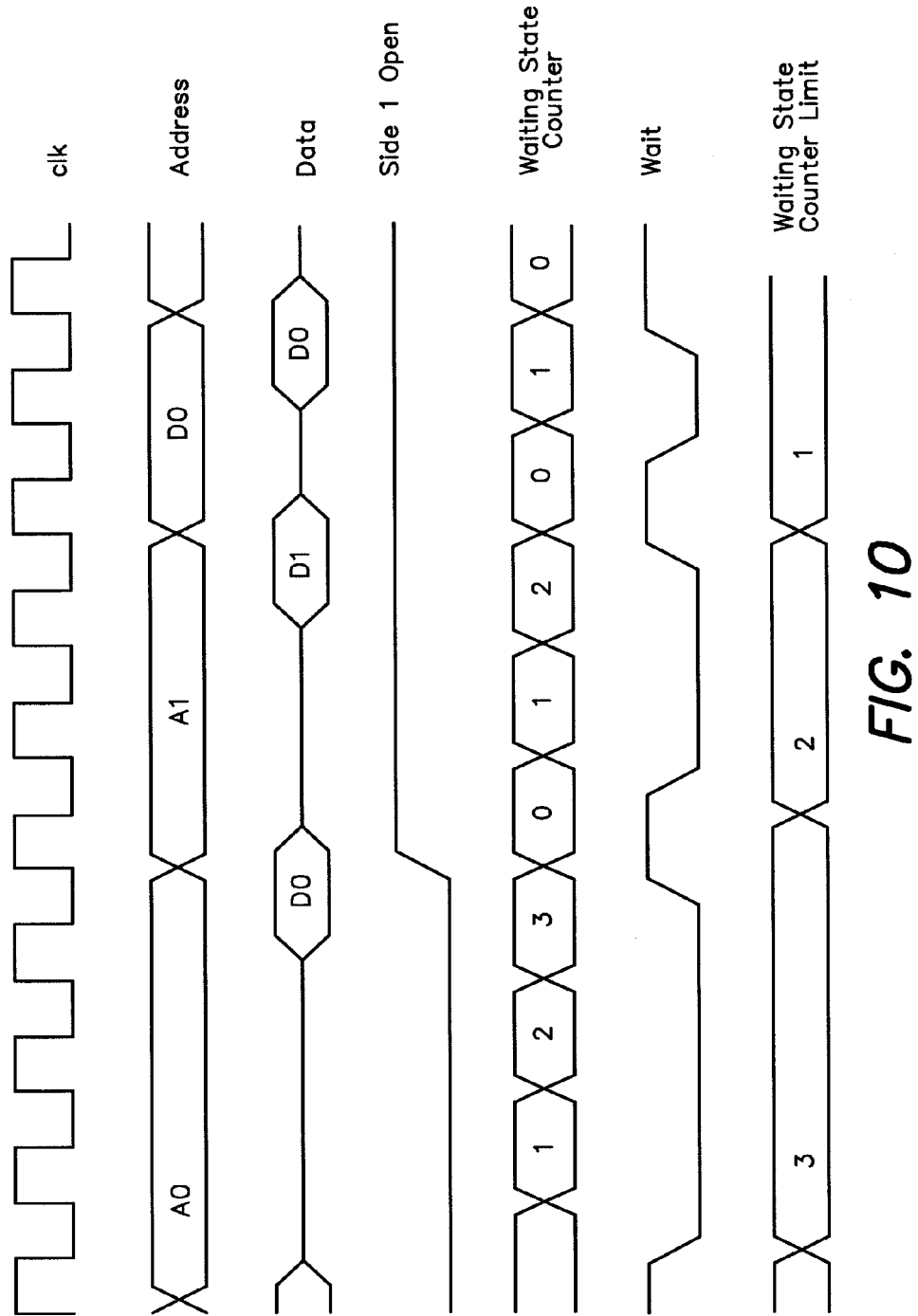

FIG. 10 illustrates the case of an external storage device, which has a mechanism enabling a faster memory access to a page or a bank already opened before, i.e., one which is open. Such mechanisms are provided by SDRAMs, as well as several types of flash memory devices. Thus, it involves access to an open page or a memory bank tracking. The address comparator AC sends the corresponding information to the configuration logic CL, which controls the waiting state counter WC. In the exemplary embodiment represented, the first address A0 is assigned to a first page and the second applied address A1 to a page different from it. As shown, the waiting state counter WC after the application of the first address A0 is incremented from state 0 up to state 3, during which the waiting state signal "wait" is in the low-set state. When the waiting state counter WC reaches the limit value 3, the waiting state signal "wait" is set in the high state for one clock pulse and the waiting state counter WC is set back at the base value 0. Since the page in the external storage device is opened, a corresponding signal to signal the open page is also set high. Alternatively, a flag or value in a storage device M of the memory control unit aMC can also be set. At this time, moreover, first data D0 are transferred, being assigned to the first address A0. The second address A1 is then applied, being assigned to a page different from the first page. Two waiting states are assigned to this access, which is signaled to the waiting state counter WC. Consequently, the waiting state counter WC counts only up to the value 2, during which the waiting state signal "wait" is set in the low state. After reaching the count of 2 in the waiting state counter WC, the waiting state signal "wait" is set high for one clock pulse clk, in order to transfer second data D1 according to the second address A1 over the data bus DB.

There then occurs another access to the still open first page with the first address A0. Since the page is already open, only one waiting state instead of the usual three waiting states required for a first access to the page is needed. This is taken into account by the limit value "limit" for the waiting state counter WC, so that the waiting state counter WC only counts up to the value 1 and accordingly the waiting state signal is only set low for one clock pulse clk. Thus, two clock pulses clk after the transfer of the second data, a transfer of additional data D0 corresponding to the now applied first address A0 can be done on the data bus DB. Instead of the subsequent access to the still open first page by the first address A0, it is also possible to access another address, e.g., singly-incremented address A0+1.

Figure 11:
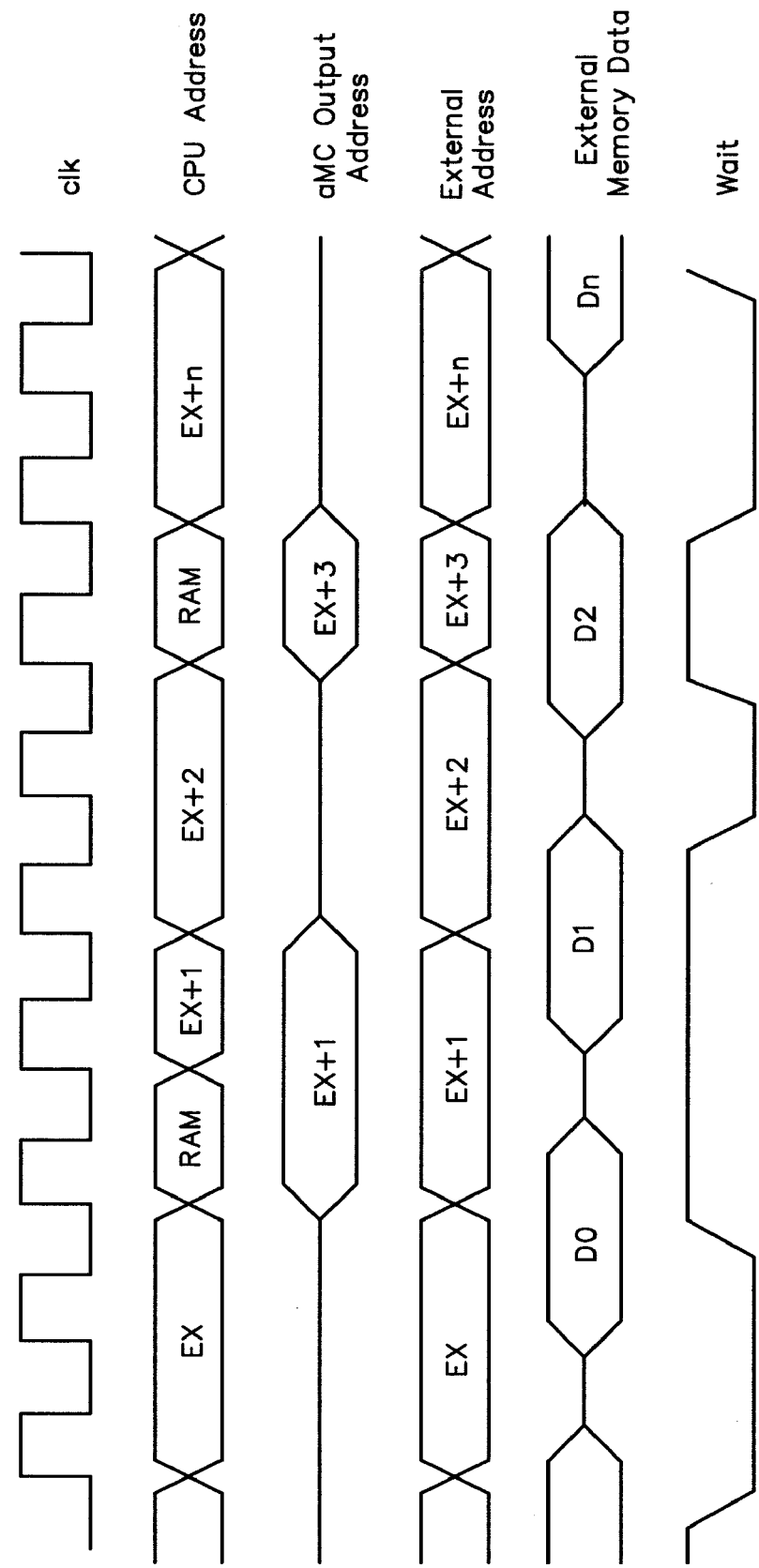

FIG. 11 shows the case of an address incrementation, which is prepared for preparing an address for a previous retrieval, while the central control unit CPU is in an internal cycle or gaining access to an internal storage address. This feature saves on waiting states, since the external memory access can be started earlier by one or more cycles. In the event that the next instruction does not involve the reading of an incremented address (as assumed), for example, in the case of a jump instruction; the new address has to be reloaded.

The first line depicted again shows the clock pulse clk. The second line shows the applied address (CPU address) of the central control unit CPU. For the next two clock pulses clk, addresses of a direct access memory RAM and an address EX+1 incremented by 1 of the external storage device are applied. After this, for two clock pulses, an address EX+2 further incremented by 1 and after that, for one clock pulse, the address of the direct access memory RAM is applied. Lastly, for the next two clock pulses, the further incremented address EX+n of the external storage device is applied. The third line shows the address output from the memory control unit aMC (aMC output address). While applying the address of the direct access storage device RAM, the correspondingly incremented external addresses EX+1 or EX+3 are output each time by the memory control unit aMC. The fourth line shows the particular external address, which refers each time to the current address value or, if the memory access continues, to the next applied external address value EX, EX+1, EX+2, EX+3, EX+n. The fifth line indicates the external memory data (ext mem data) transferred each time DO, D1, D2, Dn. The last line, again, shows the state of the waiting signal "wait". This changes from the low to the high state each time an address of the internal storage device or another external storage device is applied, and also to the low state when an incremented address of the external storage device is applied.

Figure 12:
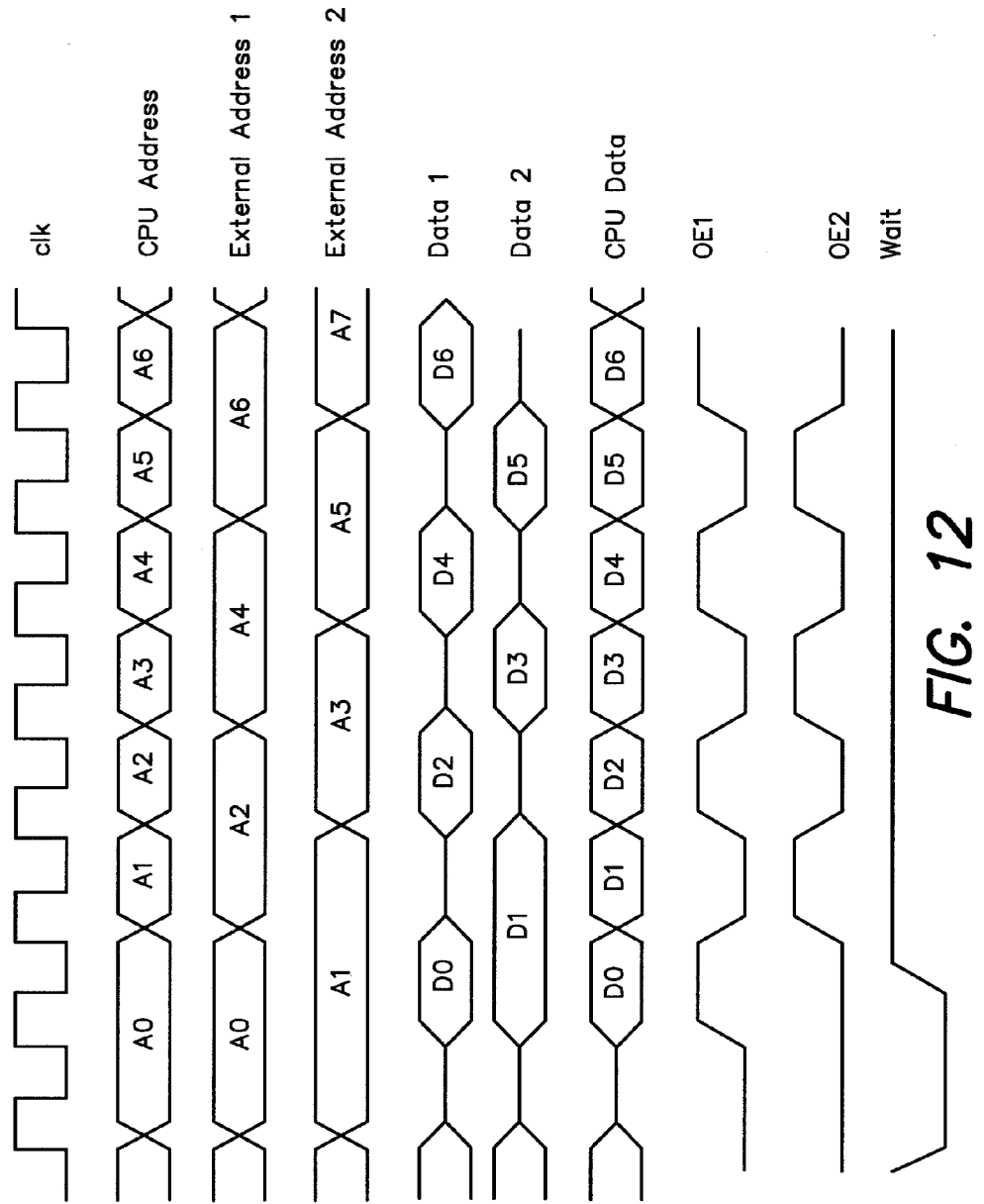

FIG. 12 shows an example of an asynchronous interleaved mode. This exemplary embodiment serves an efficient use of asynchronous external storage devices. In principle, the memory control unit aMC implements a burst mode approximation, making use of n storage devices, which accelerates the data or the data transmission n-fold. The flowchart in the Figure shows an example with two devices, the asynchronous access time corresponding to one clock cycle. Therefore, no waiting states are required for a burst access.

The first line, once again, shows the clock signal clk. The second line represents the current address (CPU address) of the central control unit CPU, in the present case the first address A0 for two clock pulses and then a subsequent address incremented by 1 each time A1, A2, ..., A6. The third line shows a first external address, whereupon an address change occurs for two clock cycles. For the first two clock cycles of the clock pulse clk the first address A0 is applied; for the additional two clock cycles, an address A2, A4, A6 incremented by two each time is applied. The next line shows the state of the second device used and signals the second external address. After three cycles of the clock pulse clk or during the third cycle, the second address A1 is applied. After this, for two clock cycles of the clock pulse clk each time, an address A3, A5, A7 incremented by two is applied. In configurations with more corresponding devices, the incrementation number is increased to correspond to the number of available self-standing external address lines. In the exemplary embodiment depicted, the fifth line shows the transfer of the corresponding first data D0, D2, D4, D6 according to the first external address. The next line shows the transfer of the second data D1, D3, D5, which are transferred according to the second external address. The seventh line shows the data D0, D1, D2, ..., D6, which are accordingly available to the central control unit CPU. The next two lines show the corresponding signaling states OE1, OE2 of the separate storage devices. These are in a reverse state and change each time in the cycle of two clock pulses clk. The waiting state signal "wait" changes, after the start of the procedure, i.e., already after a clock cycle, from the low to the high state, and remains high, since no waiting states are to be inserted.

Figure 13:
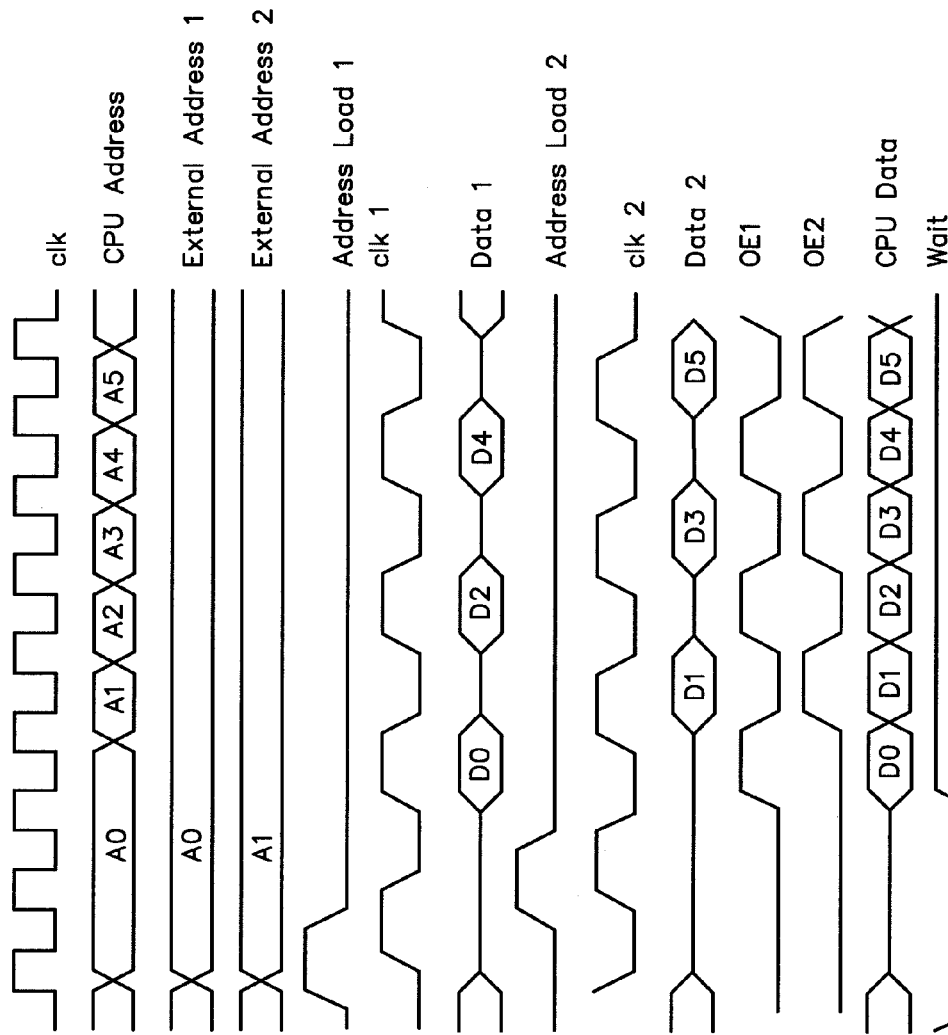

FIG. 13 illustrates an embodiment for the case of a synchronous interleaved mode, which enables an n-fold faster external memory access making use of n-burst mode devices. The flowchart shows an example of interleaved data of two burst mode devices. For each memory, two waiting states are required for the initial access and one for the in-burst access. Therefore, in the interleaved mode, no waiting states are required for an in-burst access.

The first line shows, again, the course of the clock signal clk. The second line shows, again, the applied CPU address, a first address A0 being applied for the first three clock pulses clk. After this, subsequent addresses A1, A2-A5 are applied, each for one clock pulse clk.

The third and the fourth line show the state of the first and second external address. The first and the second address A0, A1 are applied accordingly at these starting from the first clock pulse. The fifth line shows the state of an address load signal Lade-Adr.-1, which is set in the high state and then back in the low state for the duration of the first clock pulse. The next line shows the signal of a first auxiliary clock pulse clk 1, which is set in the high or the low state for the duration of around 1.5 cycles of the clock pulse clk each time. The seventh line shows the transmitted first data (data 1), in the present case, first data D0 starting from the third clock pulse clk, third data D2 starting from the fifth clock pulse clk, and fifth data D4 starting from the seventh clock pulse clk, this for a duration of one clock pulse clk each time. The next three lines show the state of a signal for signaling the loading of a second address (Lade-Adr.-2), of a second auxiliary clock pulse clk2, as well as additional transmitted data (data 2), the signals being displaced each time by one clock pulse clk relative to the group of corresponding signals of the three preceding lines. Second, fourth, and sixth data D1, D3, D5 are transferred. According to the diagram of FIG. 12, signaling signals OE1, OE2 are again used to coordinate the two data flows, during whose respective high states the data from the first or second group are provided to the central control unit CPU on a corresponding data line or a bus as CPU data. The waiting state signal "wait" in this procedure is set in the low state only during the first two clock pulses and thereafter is constantly in the high state.

Although the present invention has been shown and described with respect to several preferred embodiments thereof, various changes, omissions and additions to the form and detail thereof, may be made therein, without departing from the spirit and scope of the invention.

What is claimed is:

1. A method for controlling a memory access to a storage device, comprising the steps of:

determining a number of waiting states for the memory access to the storage device by a central control unit, where the step of determining further comprises the step of analyzing at least one of a current state of the central control unit, a type of the storage device being accessed, and an address of the storage device being accessed; and comparing in an address comparator an address at a current point in time with an address at an earlier point in time to determine whether the current address is assigned to a storage device without required waiting states and to determine whether the current address prior to the current address and subsequent to the current address is assigned to a storage device with required waiting states, where the number of required waiting states for memory access with required waiting states is reduced if the memory accesses to the storage device with required waiting states involve one of incrementing addresses, same addresses, or addresses of the same memory page.

2. The method of claim 1, further comprising the steps of where the memory control unit in the cycle of the memory access to the storage device generates an additional address and provides the additional address to the storage device.

3. A method for controlling a memory access to an storage device, comprising the steps of:

determining a number of waiting states for the memory access to the storage device by a control unit, where the step of determining further comprises the step of analyzing at least one of a current state of the control unit, a type of the storage device being accessed, and an address of the storage device being accessed; and comparing an address at a current point in time with an address at an earlier point in time to determine whether the current address is assigned to a storage device without required waiting states and to determine whether the current address prior to the current address and subsequent to the current address is assigned to a storage device with required waiting states, where the number of required waiting states for memory access with required waiting states is reduced if the memory accesses to the storage device with required waiting states involve one of incrementing addresses, same addresses, or addresses of the same memory page.

* * * * *